United States Patent [19]
Jarrett

[11] 3,983,855
[45] Oct. 5, 1976

[54] FUEL INJECTION SYSTEM
[75] Inventor: Boaz Antony Jarrett, Sevenoaks, England
[73] Assignee: C.A.V. Limited, Birmingham, England
[22] Filed: Mar. 27, 1975
[21] Appl. No.: 562,449

Related U.S. Application Data
[62] Division of Ser. No. 488,151, July 12, 1974.

[30] Foreign Application Priority Data
July 12, 1973  United Kingdom............... 33337/73

[52] U.S. Cl. ..................... 123/139 E; 123/139 AS; 123/139 AT
[51] Int. Cl.² .......................................... F02D 5/02
[58] Field of Search ... 123/139 E, 139 DP, 139 AK, 123/139 AL, 139 AM, 139 AS, 139 AT

[56] References Cited
UNITED STATES PATENTS
| | | | |
|---|---|---|---|
| 3,391,680 | 7/1968 | Benson............................ | 123/139 R |
| 3,465,733 | 9/1969 | Thornber..................... | 123/139 R X |
| 3,752,136 | 8/1973 | Knight et al. ............. | 123/139 AS X |
| 3,919,989 | 11/1975 | Jarrett et al..................... | 123/139 R |

Primary Examiner—Charles J. Myhre
Assistant Examiner—Tony M. Argenbright
Attorney, Agent, or Firm—Holman & Stern

[57] ABSTRACT

A fuel injection system for an internal combustion engine provided with a cylinder, a air of fluid pressure operable valve means to control the supply of pressure fluid to and allowing the escape of fluid from one end of the cylinder, with the valves operating at different pressures, a fluid pressure generator supplying the fluid pressure to the valves, an actuating piston in the cylinder, resilient means urging the actuating piston towards one end of the cylinder, with the actuating piston being moved against the action of the resilient means when fluid under pressure is admitted to one end of the cylinder, and a fuel pumping piston arranged to be operated by the actuating piston to displace fuel to an outlet.

10 Claims, 2 Drawing Figures

FUEL INJECTION SYSTEM

This is a divisional of application Ser. No. 488,151, filed July 12, 1974.

BACKGROUND OF THE INVENTION

This invention relates to a fuel injection system and more particularly to a fuel injection system for an internal combustion engine.

SUMMARY OF THE INVENTION

A fuel injection system for an internal combustion engine including a cylinder, a pair of fluid pressure operable valve means for controlling the supply of fluid under pressure to and allowing the escape of fluid from one end of said cylinder, said valve means operating at different pressures, a fluid pressure generator supplying the fluid pressure to said valve means, said generator comprising a second cylinder, a second piston slidable within said second cylinder, with movement of the second piston in one direction acting to pressurize fluid contained in the second cylinder, a stack of piezo-electric crystals mechanically coupled to the second piston, said stack being divided into electrically isolated portions, and means for charging said portions of the stack of crystals to impart different movements to the second piston whereby to achieve different fluid pressures in the second cylinder, an actuating piston in said first-mentioned cylinder, resilient means urging the actuating piston towards one end of the first-mentioned cylinder, said actuating piston being moved against the action of said resilient means when fluid under pressure is admitted to said one end of the first-mentioned cylinder, an outlet, and a fuel pumping piston arranged to be operated by said actuating piston to displace fuel to said outlet.

One example of a fuel injection system for supplying fuel to an internal combustion engine and a fluid pressure generator will now be described with reference to the accompanying drawings, in which.

Figure 1:
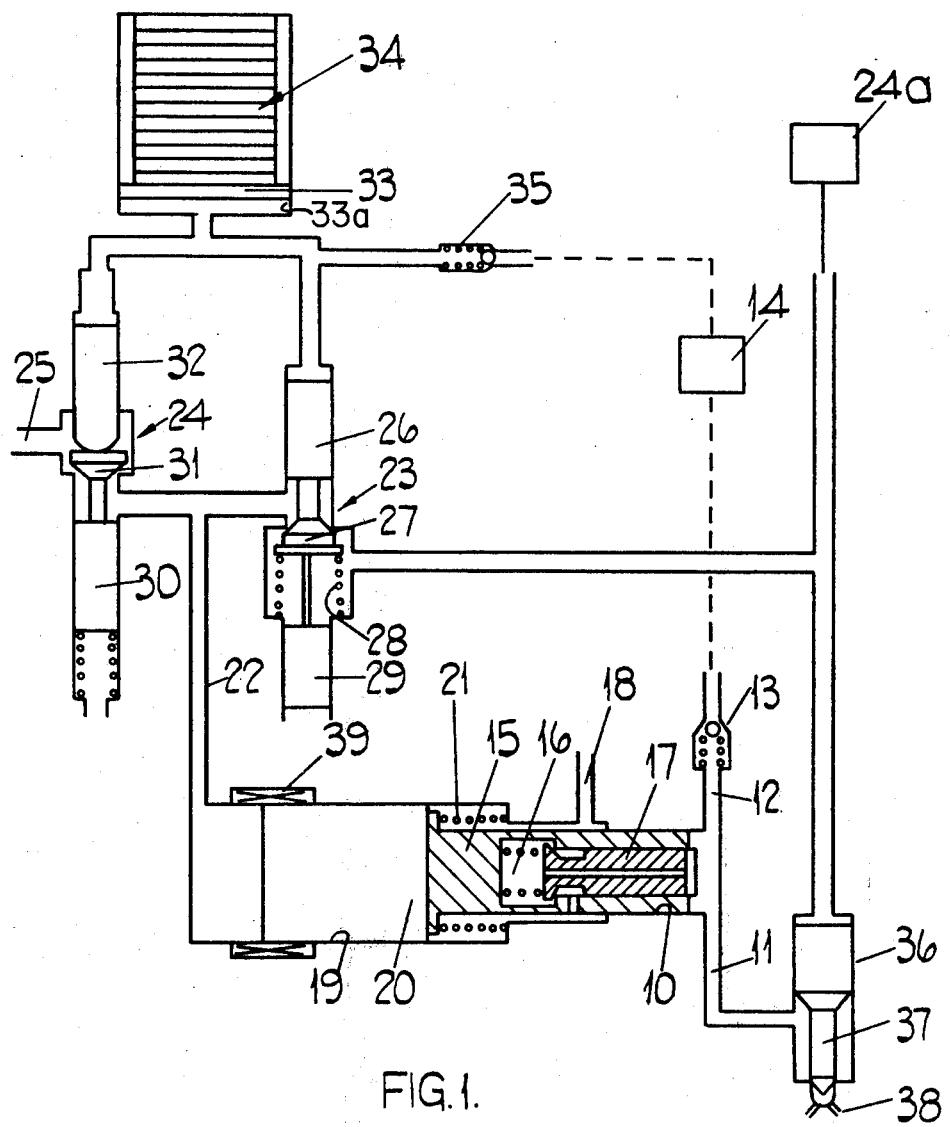
FIG. 1 shows the generator and the associated fuel injection system.

Referring to FIG. 1 of the drawings, there is shown therein a fuel injection system for supplying fuel to an internal combustion engine. As shown in the drawings, there is provided a cylinder 10, one end of which communicates with an outlet 11 and a fuel inlet 12, with the fuel inlet being connected, by way of a non-return valve 13, to a source 14 of fuel. Located within the cylinder 10 is a displacement piston 15 in which is located a valve chamber 16 which accommodates the head of a valve member 17, and the body of the valve member projects beyond the end of the piston 15. The valve member 17 is spring loaded so that its head engages a seating defined about the wall of the chamber 16. The chamber 16 communicates with the outlet 11 by way of an axial drilling formed in the valve member, and the space beneath the head of the valve member communicates, by way of a cross drilling in the valve member, with a drain 18, and for this purpose, the portion of the cylinder which accommodates the piston 15 is slightly enlarged.

Also provided is a further cylinder 19 which is co-axially disposed with the cylinder 10 and this contains a fluid pressure operable member 20. The cylinder 19 and the fluid pressure operable member 20 are larger in diameter than the cylinder 10 and the displacement piston 15, and the piston 15 is spring loaded by means of a coiled compression spring 21 which acts to move the piston together with the member 20 in a direction away from the outlet 11.

The other end of the cylinder 19 is connected to a passage 22, which can be connected by way of a first valve 23 to an accumulator 24a which contains liquid, preferably fuel, at a high pressure. Alternatively, the passage 22 may be connected by way of a second valve 24 to a drain passage 25.

The valve 23 includes a pressure actuated valve member 26 having an integral head 27. The head 27 is loaded into contact with a seating by means of a coiled compression spring 28, and in this position, the supply of liquid from the accumulator 24a to the passage 22 is broken. In addition, the valve member 26 is provided with a pressure balancing element 29.

The second valve 24 includes a slidable valve element 30 including a head 31 which can co-operate with a seating to prevent flow of liquid from the passage 22 to the drain passage 25. The valve element 30 is spring loaded in a direction to open the valve, and it is moved to the closed position by means of a valve actuating piston 32. The piston 32 can be subjected to a fluid pressure developed by a piston 33 which is mechanically coupled to a stack 34 of piezo-electric crystals. These will be described later, with reference to FIG. 2. In addition, the piston 33 is moved to develop a pressure, upon energization of the stack of crystals, and it has the effect of closing the second valve 24 and opening the first valve 23. A cylinder 33a occupied by the piston 33 together with the chambers communicating therewith are maintained full of liquid, conveniently fuel, by way of a non-return valve 35.

As shown in the drawing, the outlet 11 is connected to an injection nozzle 36 which includes a differential valve 37 of the usual type. This valve is urged into contact with a seating to prevent flow of fuel through orifices 38 into a combustion space of an associated engine by the application of fluid pressure from the accumulator 24a.

In operation, the valves 23 and 24 are shown in the position which they adopt during return motion of the member 20 and displacement piston 15 under the action of the spring 21 and also under the action of fuel flowing past the non-return valve 13. After a predetermined movement, as will be explained, the stack of crystals 34 is partly energized and the piston 33 develops sufficient fluid pressure to close the second valve 24 only, with the first valve 23 remaining closed. When it is desired to start injection, the stack of crystals is fully energized to open the first valve 23. In this situation, pressure from the accumulator 24a is applied to the end of the member 20, and this effects movement of the displacement piston 15 so as to pressurize the fuel in the outlet 11. When a predetermined pressure has been reached, which it will be understood is higher than the accumulator pressure, the valve member of the injection nozzle 36 is lifted and a flow of fuel occurs through the outlet 11 and through the orifices 38 to a combustion space of the engine. This flow of fuel continues until the valve member 17 contacts the end of the cylinder 10, and when this occurs, the head of the valve element is lifted from its seating to permit extra fuel displaced by movement of the displacement piston 15, to flow to the drain 18. At the same time, the valve member of the injection nozzle 36 is closed onto its seating by the predominating pressure from the accumulator 24a. It will be appreciated, of course, that the pressure of fuel delivered to the outlet 11 is higher than the accumulator pressure by virtue of the fact that the area of the end of the member 20 which is exposed to the accumulator pressure, is greater than the area of the end of the displacement piston 15.

The stack of crystals 34 is de-energized shortly after the end of injection and the valves return to the position shown in the drawing. In addition, the displacement piston 15, together with the pressure operable member 20 move under the action of the spring 21, and the fuel pressure supplied by way of the non-return valve 13. When a piston position gauge 39 signals that sufficient fuel has been stored under the displacement piston 15 for the next injection, the stack of crystals is partly energized to close the second valve 24, with the first valve 23 remaining closed. The position gauge 39 senses the position of the displacement piston 15 and the signal developed by the position gauge is applied to an electronic control circuit which controls the operation of the stack 34 of crystals.

It is arranged that the spring which biases the second valve 24 to the open position is weaker than the spring 28 which biases the first valve 23 to the closed position. Furthermore, it is arranged that the stack of crystals 34 can be energized in several stages. The first stage of energization generates sufficient pressure by movement of the piston 33 to close the second valve 24 but not to open the first valve 23. Energization of the second stage partly opens the first valve 23 and flow of fuel from the accumulator 24a to the passage 22, is therefore at a restricted rate, and relatively slow movement of the member 20 and the displacement piston 15 occurs. Since the displacement piston is moving at a slow rate, the rate of injection of fuel to the engine will be at a reduced rate. When the stack of crystals 34 is fully energized, the piston moves at its maximum rate, and the maximum rate of transfer of fuel to the engine occurs.

Figure 2:
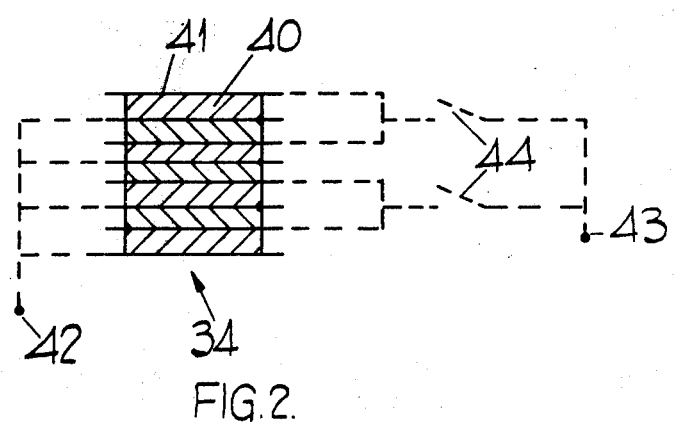
FIG. 2 shows in diagrammatic form a section through a stack of crystals forming part of the generator.

As shown in FIG. 2, the stack of crystals 34 includes a plurality of crystal elements 40 which are located between conductive plates 41. Alternate plates 41 are connected to one terminal 42 of a source of supply, and the other plates can be connected to the other terminal 43 of a source of supply. As shown in FIG. 2, the other plates are connected into groups and by energizing one group through a switch 44, only partial movement of the piston 33 will occur. When both groups are energized as by closure of both switches, then full movement of the piston 33 will occur, and the maximum fluid pressure will be developed.

It will be appreciated that more crystal elements 40 may be provided and, in some instances, it may be desirable to divide the stack into more than three groups so that, for instance, control may be obtained of the rate of injection towards the end of the injection period.

I claim:

1. A fuel injection system for an internal combustion engine including a cylinder, a pair of fluid pressure operable valve means for controlling the supply of fluid under pressure to and allowing the escape of fluid from one end of said cylinder, said valve means operating at different pressures, a fluid pressure generator supplying the fluid pressure to said valve means, including a second cylinder, a second piston slidable within the second cylinder, with movement of the second piston in one direction acting to pressurize fluid contained in the second cylinder, a stack of piezo-electric crystals mechanically coupled to the second piston, said stack being divided into electrically isolated portions, and means for charging said portions of the stack of crystals to impart different movements to the second piston whereby to achieve different fluid pressure in the second cylinder, an actuating piston in said first mentioned cylinder, resilient means urging the actuating piston towards one end of the first mentioned cylinder, said actuating piston being moved against the action of said resilient means when fluid under pressure is admitted to said one end of the first mentioned cylinder, an outlet, and a fuel pumping piston arranged to be operated by said actuating piston to displace fuel to the outlet.

2. The system as claimed in claim 1 including a fuel injection nozzle connected to said outlet.

3. The system as claimed in claim 1 including a third cylinder in which said actuating piston is located, said first mentioned and third cylinders being co-axial with each other, said actuating piston defining a surface engaged by said resilient means whereby both the actuating piston and the fuel pumping piston are urged by the resilient means towards said one end of the first mentioned cylinder.

4. The system as claimed in claim 3 in which said outlet communicates with the remote end of said third cylinder from said first mentioned cylinder.

5. The system as claimed in claim 4 including a drain, valve means operable to place the remote end of the third cylinder in communication with the drain at a predetermined position during movement of the pistons towards the remote end of the third cylinder.

6. The system as claimed in claim 5 including means for supplying fuel to the remote end of the third cylinder during movement of the pistons under the action of the resilient means.

7. The system as claimed in claim 1 in which the one of said pair of valve means which operates to prevent escape of fluid from said one end of the first mentioned cylinder operates at a lower pressure than the other of said pair of valve means.

8. The system as claimed in claim 6 in which the source of fluid for said one end of the cylinder comprises an accumulator.

9. The system as claimed in claim 8 including a fuel injection nozzle connected to said outlet, said nozzle including a fluid pressure operable valve member which is biased to a closed position by fluid under pressure from said accumulator.

10. The system as claimed in claim 9 in which the valve member of the injection nozzle has a smaller area subjected to the pressure at said outlet than its area which is subjected to the accumulator pressure, with said third piston having a smaller area than said first mentioned piston.

* * * * *